(12) United States Patent
Patino et al.

(10) Patent No.: US 11,357,154 B2
(45) Date of Patent: Jun. 14, 2022

(54) POWER LIFT FOR AN AGRICULTURAL TRACTOR

(71) Applicant: DEERE & COMPANY, Moline, IL (US)

(72) Inventors: Mario Patino, Ludwigshafen (DE); Martin Heitlinger, Oestringen (DE)

(73) Assignee: DEERE & COMPANY, Moline, IL (US)

( * ) Notice: Subject to any disclaimer, the term of this patent is extended or adjusted under 35 U.S.C. 154(b) by 322 days.

(21) Appl. No.: 16/665,629

(22) Filed: Oct. 28, 2019

(65) Prior Publication Data

US 2020/0128718 A1 Apr. 30, 2020

(30) Foreign Application Priority Data

Oct. 26, 2018 (DE) .......................... 102018218408.9

(51) Int. Cl.
*A01B 63/118* (2006.01)
*A01B 63/111* (2006.01)

(52) U.S. Cl.
CPC ........... *A01B 63/118* (2013.01); *A01B 63/111* (2013.01)

(58) Field of Classification Search
CPC ............................. A01B 63/111; A01B 63/118
See application file for complete search history.

(56) References Cited

U.S. PATENT DOCUMENTS

| 3,791,454 | A | * | 2/1974 | Koch et al. | .......... | A01B 59/062 |
| | | | | | | 172/7 |
| 6,253,859 | B1 | | 7/2001 | Coenen | | |
| 2002/0189828 | A1 | * | 12/2002 | Casali et al. | ......... | A01B 59/004 |
| | | | | | | 172/439 |

FOREIGN PATENT DOCUMENTS

| CN | 101823414 A | 9/2010 |
| DE | 4426925 A1 | 2/1996 |
| DE | 29719747 U1 | 12/1997 |
| EP | 3219183 A1 | 9/2017 |
| EP | 3498065 A1 | 6/2019 |

OTHER PUBLICATIONS

European Search Repod issued in counterpad European Patent Application No. 19202771.2 dated Mar. 27, 2020 (13 pages).
Laforge 8R Front Hitch, retrieved from <https://www.laforgegroup.com/en/john-deere/serie-8/8r/8r-it4-ft4> on Apr. 17, 2020, 4 pages.

(Continued)

*Primary Examiner* — Tara Mayo-Pinnock

(57) ABSTRACT

A power lift for an agricultural tractor includes a supporting structure configured to be mounted on the agricultural tractor. A left lower link, a right lower link, and an upper link are coupled in a pivotally movable manner, wherein the left and the right lower links and the upper link include coupling elements for attachment of an agricultural attachment. The left and the right lower links are rotatably coupled to one another via a lifting shaft, the lifting shaft being aligned with a lower link pivot axis. The left and the right lower links are pivotable by an actuating element which runs between at least one of the lower links and a support point of the supporting structure jointly about the lower link pivot axis in relation to the supporting structure.

20 Claims, 3 Drawing Sheets

(56) References Cited

OTHER PUBLICATIONS

Terra Variant 435 Three Point Mount Optimized, 2020 Holmer Maschinenbau GmbH, retrieved from <https://www.holmer-maschinenbau.com/en/products/system-vehicle/terra-variant-435/terra-variant-435.html> on May 11, 2020, 15 pages.
Zuidberg Front Hitch, 2012-2020 Frontlink Inc., retrieved from <https://frontlinkinc.com/products/front-hitch/> on May 11, 2020, 4 pages.
Walterscheid Tractor Attachment System Brochure, 2013 (version 3.0), retrieved from the internet on Apr. 16, 2020, 24 pages.
Fendt 900 Vario Front Linkage Brochure, retrieved from the internet on May 11, 2020, 19 pages.

* cited by examiner

POWER LIFT FOR AN AGRICULTURAL TRACTOR

RELATED APPLICATIONS

This application claims priority to German Patent Application Ser. No. 102018218408.9, filed Oct. 26, 2018, the disclosure of which is hereby incorporated by reference in its entirety.

FIELD OF THE DISCLOSURE

The present disclosure relates to a power lift for an agricultural tractor with a supporting structure which can be mounted on the agricultural tractor on which left and right lower links as well as a central upper link are attached in a pivotally movable manner, wherein both the lower links and the upper link have associated coupling elements for attachment of an agricultural attachment.

BACKGROUND

Conventional power lifts are widespread in the form of three-point attachments to agricultural tractors. The power lift fitted in the rear area of the agricultural tractor usually comprises a hydraulic hoist, which has left and right hydraulic lifting cylinders which serve the purpose of pivoting actuation of associated lifting arms which are rotatably connected to one another by means of a lifting shaft mounted in the rear area of the agricultural tractor. There are fitted at the free ends of the lifting arms in each case a lifting strut, on which in turn one of the two lower links is suspended so that the two lower links can be synchronously raised or lowered with respect to the ground by retracting or extending the hydraulic lifting cylinders. As a result of the plurality of movable parts, the costs and installation space requirement of such a power lift are comparatively high.

Thus, there is a need to structurally simplify a power lift of the above-mentioned type in terms of its design with the same performance and the same lifting capacity.

SUMMARY

In the present disclosure, a power lift for an agricultural tractor comprises a supporting structure which can be mounted on the agricultural tractor on which left and right lower links as well as a central upper link are attached in a pivotably movable manner. Both of the lower links and the upper link have associated coupling elements for attachment of an agricultural attachment. The two lower links are rotatably coupled to one another via a lifting shaft which is aligned with a lower link pivot axis, wherein the two lower links can be pivoted by means of an actuating element which runs between at least one of the lower links and a support point of the supporting structure jointly about the lower link pivot axis in relation to the supporting structure.

The omission of the two lifting arms and the lifting struts of conventional power lifts leads, without reduced performance or lifting capacity, to a particularly simple and space-saving design of the power lift.

The supporting structure is formed, for example, in the rear area of the agricultural tractor by a differential housing or the like, wherein the lifting shaft is attached to the differential housing by means of associated rotary bearings. The lower link pivot axis defined by the lifting shaft runs in this case in the transverse direction of the agricultural tractor.

The coupling elements provided on the lower links and the upper link are generally formed by detachable arrestor hooks which serve to receive corresponding coupling points of the agricultural attachment. To be more precise, the agricultural attachment has what is known as an A-frame with left and right lower coupling points as well as a central upper coupling point.

In order to provide the degree of lateral freedom at the power lift which is necessary during operation of certain agricultural attachments, it is conceivable that each of the two lower links is pivotally articulated at the lifting shaft about a transverse axis running perpendicular to the lower link pivot axis. For the purpose of articulation, each of the two lower links has at an end facing the tractor a fork joint which engages around the lifting shaft and which is received by means of a pivot bolt in a transverse bore of the lifting shaft. The degree of lateral freedom can be restricted in a targeted manner by means of a side stabilizer running between the lower link and the supporting structure.

The actuating element is typically a hydraulic lifting cylinder which is articulated with a lower end at the lower link and with an upper end at the support point of the supporting structure. The support point is formed in particular in the configuration of a gallows-shaped retaining leg which is attached on an upper side of the differential housing and on which the hydraulic lifting cylinder is suspended with its upper end. The gallows-shaped formation of the retaining leg enables an increased upper articulation of the hydraulic lifting cylinder which in turn leads to a correspondingly widened actuating path of the two lower links. The hydraulic lifting cylinder itself can be formed in a single- or double-acting manner.

It is furthermore possible that an adjustment means or mechanism is provided at at least one of the two lower links for height adjustment of the coupling element independently of a pivoting movement performed by means of the at least one actuating element. This enables compensation of an incorrect vertical position present between the lower coupling points of the agricultural attachment.

The at least one lower link can be divided by length into a first lower link segment assigned to the supporting structure and a second lower link segment which supports the coupling element, wherein the second lower link segment can be pivoted vertically by means of the adjustment means or mechanism with respect to the first lower link segment and can be locked in different pivoting positions. The adjustment means or mechanism comprises, for example, a pin or knee joint which connects the two lower link segments as well as a locking means or mechanism for fixing a pivoting movement performed via the pin or knee joint.

It is possible here that the adjustment means for pivoting and locking the two lower link segments has a self-locking spindle drive. The spindle drive can be actuated by hand, for example, by means of a crank. This therefore enables a force-saving continuous pivoting of the two lower link segments, wherein these are always locked in their respective pivoting position as a result of the self-locking properties of the spindle drive. The spindle drive comprises in particular a threaded spindle which can be rotated by means of the crank, which is supported within a holder formed on the first lower link segment and engages into a thread insert mounted in the second lower link segment. For the sake of completeness, it should be noted that the use of an electromotor drive or the like is also possible instead of a manual actuation of the spindle drive by means of a crank.

On the other hand, it is also possible that the adjustment means or mechanism has a detachable bolt connection for locking the two lower link segments in one of several fixed pivoting positions. The holder formed on the first lower link segment comprises in this case several openings which correspond to the individual pivot positions for receiving a mounting bolt which engages in a mating opening provided in the second lower link segment for locking of said second lower link segment. The retaining bolt can be secured at its free end by means of a splint or the like from unintentionally falling out of the holder.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein.

Corresponding reference numerals are used to indicate corresponding parts throughout the several views.

DETAILED DESCRIPTION

The embodiments of the present disclosure described below are not intended to be exhaustive or to limit the disclosure to the precise forms disclosed in the following detailed description. Rather, the embodiments are chosen and described so that others skilled in the art may appreciate and understand the principles and practices of the present disclosure.

Figure 1:
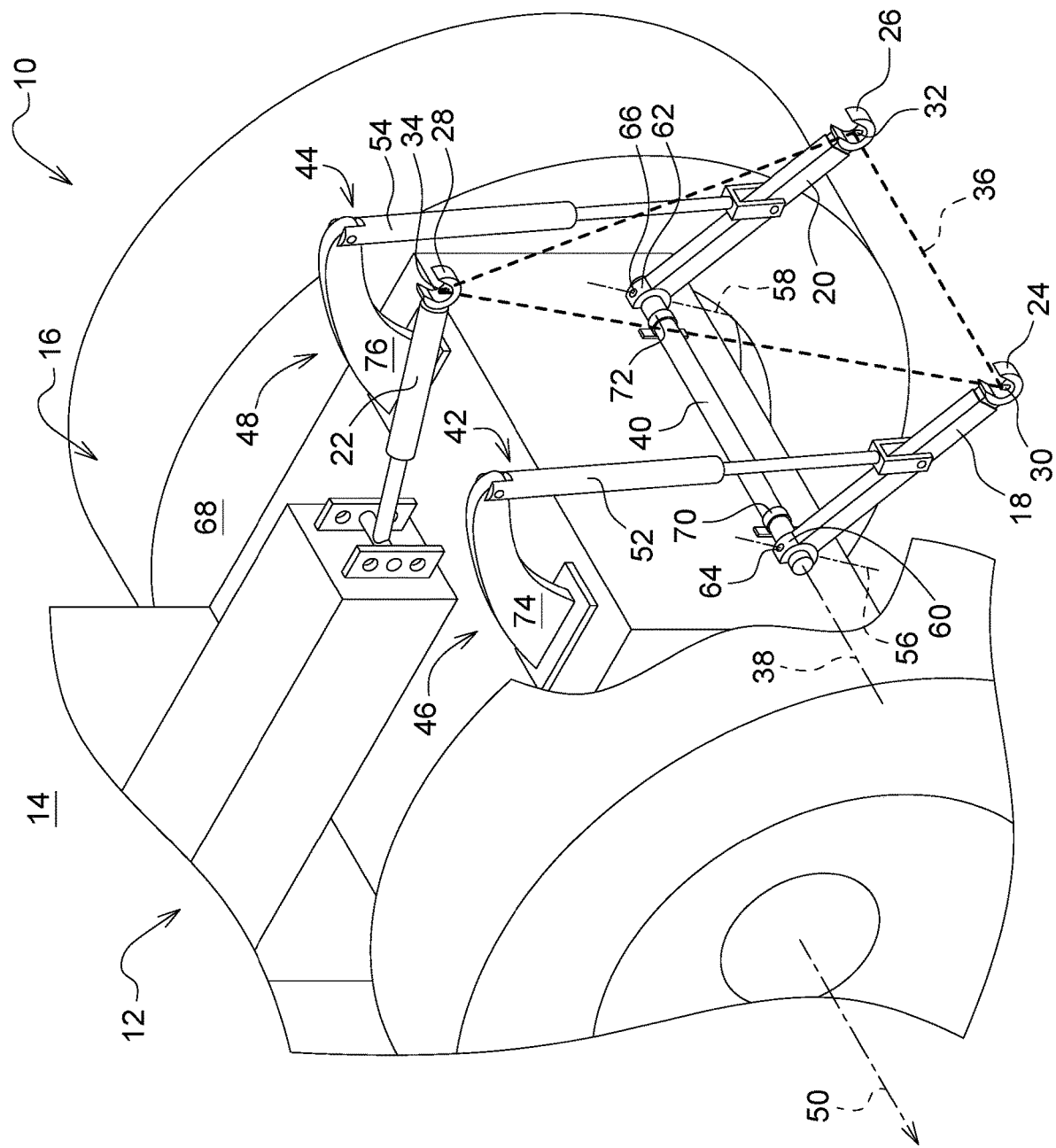
FIG. 1 shows an exemplary embodiment of a power lift for an agricultural tractor.

FIG. 1 shows a power lift 10 which is fitted in rear area 12 of an agricultural tractor 14. Power lift 10 formed as a three-point equipment extension comprises a supporting structure 16 which is mounted on agricultural tractor 14 and on which left and right lower links 18, 20 as well as a central upper link 22 are attached in a pivotably movable manner. Both lower links 18, 20 and upper link 22 have at their free ends associated coupling elements 24, 26, 28 for attachment of an agricultural attachment (not represented). Coupling elements 24, 26 or 28 provided on lower links 18, 20 or upper link 22 are formed by detachable arrestor hooks which serve to receive corresponding coupling points 30, 32 or 34 of the agricultural attachment. To be more precise, the agricultural attachment has what is known as an A-frame 36 with left and right lower coupling points 30, 32 as well as a central upper coupling point 34. Coupling points 30, 32, 34 are in this case formed by coupling balls which correspond to the arrestor hooks.

Both lower links 18, 20 are coupled rotatably to one another via a lifting shaft 40 which is aligned with a lower link pivot axis 38, wherein both lower links 18, 20 can be pivoted by means of left and right actuating elements 42, 44 which run between lower links 18, 20 and a respective support point 46, 48 of supporting structure 16 jointly about lower link pivot axis 38 in relation to supporting structure 16. Lower link pivot axis 38 defined by lifting shaft 40 runs in this case in transverse direction 50 of agricultural tractor 14.

By way of example, each of lower links 18, 20 is assigned its own actuating element 42, 44. As a result of the rigid coupling of lower links 18, 20 produced via lifting shaft 40, it is, however, in principle also sufficient to provide only one individual actuating element. Such a configuration is expedient in the case of comparatively small load requirements, for example, in the case of use in small tractors.

Actuating elements 42, 44 are hydraulic lifting cylinders 52, 54 which are a component of a hydraulic hoist of power lift 10, wherein these are respectively articulated with a lower end at lower link 18, 20 and with an upper end at support point 46, 48 of supporting structure 16. Hydraulic lifting cylinders 53, 54 themselves are formed in a single- or double-acting manner. The latter makes it possible to exert a compressive force in a targeted manner in the direction of a field surface to be worked.

In order to provide the degree of lateral freedom at power lift 10 which is necessary during operation of certain agricultural attachments, each of the two lower links 18, 20 is articulated pivotally at lifting shaft 40 about a transverse axis 56, 58 running perpendicular to lower link pivot axis 38. For the purpose of articulation, each of the two lower links 18, 20 has at an end facing the tractor a fork joint 60, 62 which engages around lifting shaft 40 and which is received by means of a pivot bolt 64, 66 in a transverse bore of lifting shaft 40. The degree of lateral freedom provided in such a manner can be restricted in a targeted manner by means of a side stabilizer (not represented) running between lower link 18, 20 and supporting structure 16. This is necessary, for example, when travelling on roads in order to prevent uncontrolled swinging to and fro of an agricultural attachment attached to power lift 10.

In the present case, supporting structure 16 is formed by a differential housing 68 of agricultural tractor 14, wherein lifting shaft 40 is attached to differential housing 68 by associated rotary bearings 70, 72. Rotary bearings 70, 72 are plain bearings or ball or roller bearings.

Support points 46, 48 are formed in the configuration of gallows-shaped retaining legs 74, 76 which are attached on an upper side of differential housing 68 and on which hydraulic lifting cylinders 52, 54 are suspended with their upper end. The gallows-shaped formation of retaining legs 74, 76 enables an increased upper articulation of hydraulic lifting cylinders 44, 46 which in turn leads to a correspondingly widened actuating path of lower links 18, 20. Retaining legs 74, 76 are flanged on by several threaded bolts on the upper side of differential housing 68.

Figure 2:
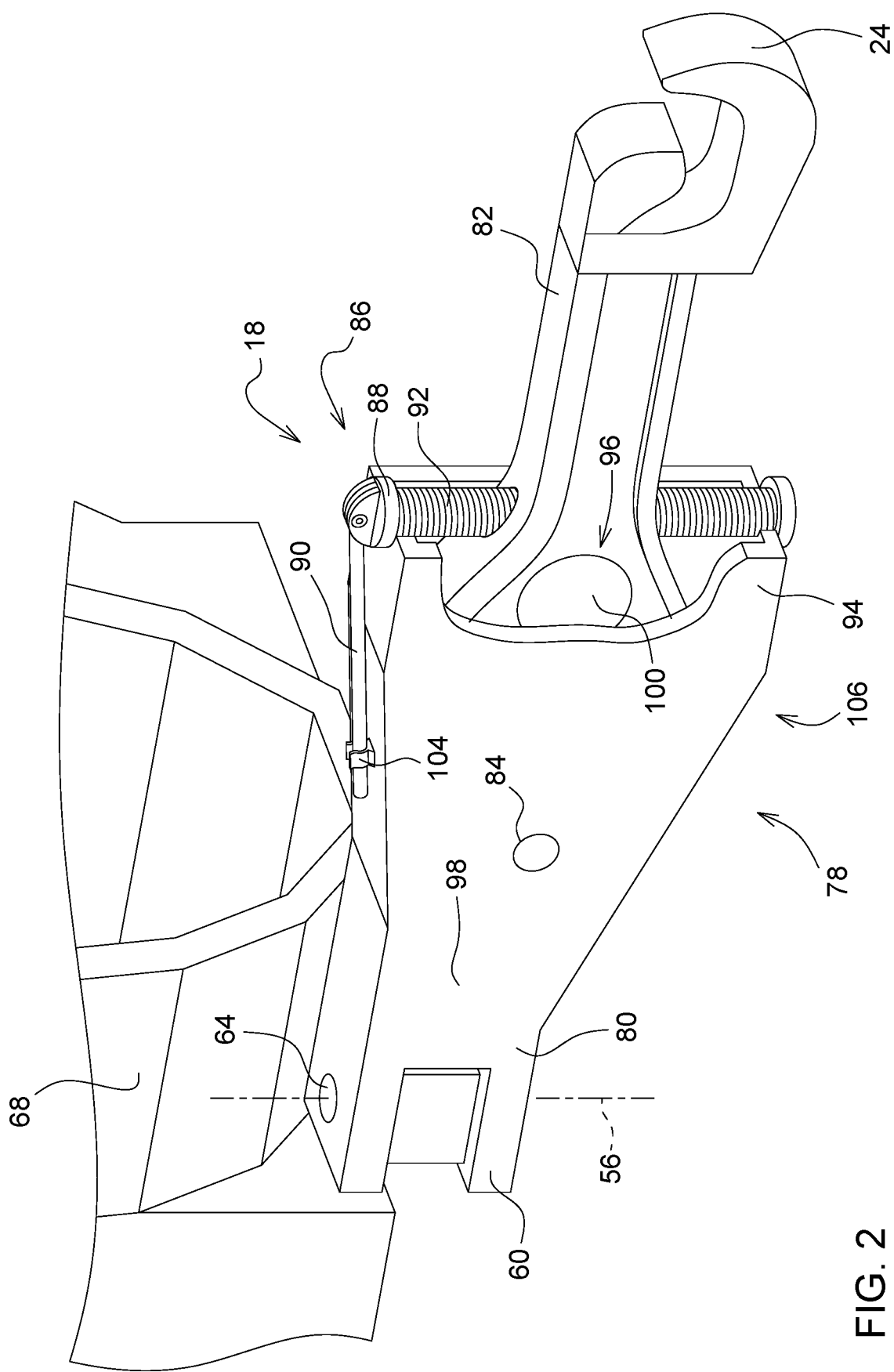
FIG. 2 shows an adjustment means or mechanism encompassed by the power lift according to FIG. 1 corresponding to a first configuration.
Figure 3:
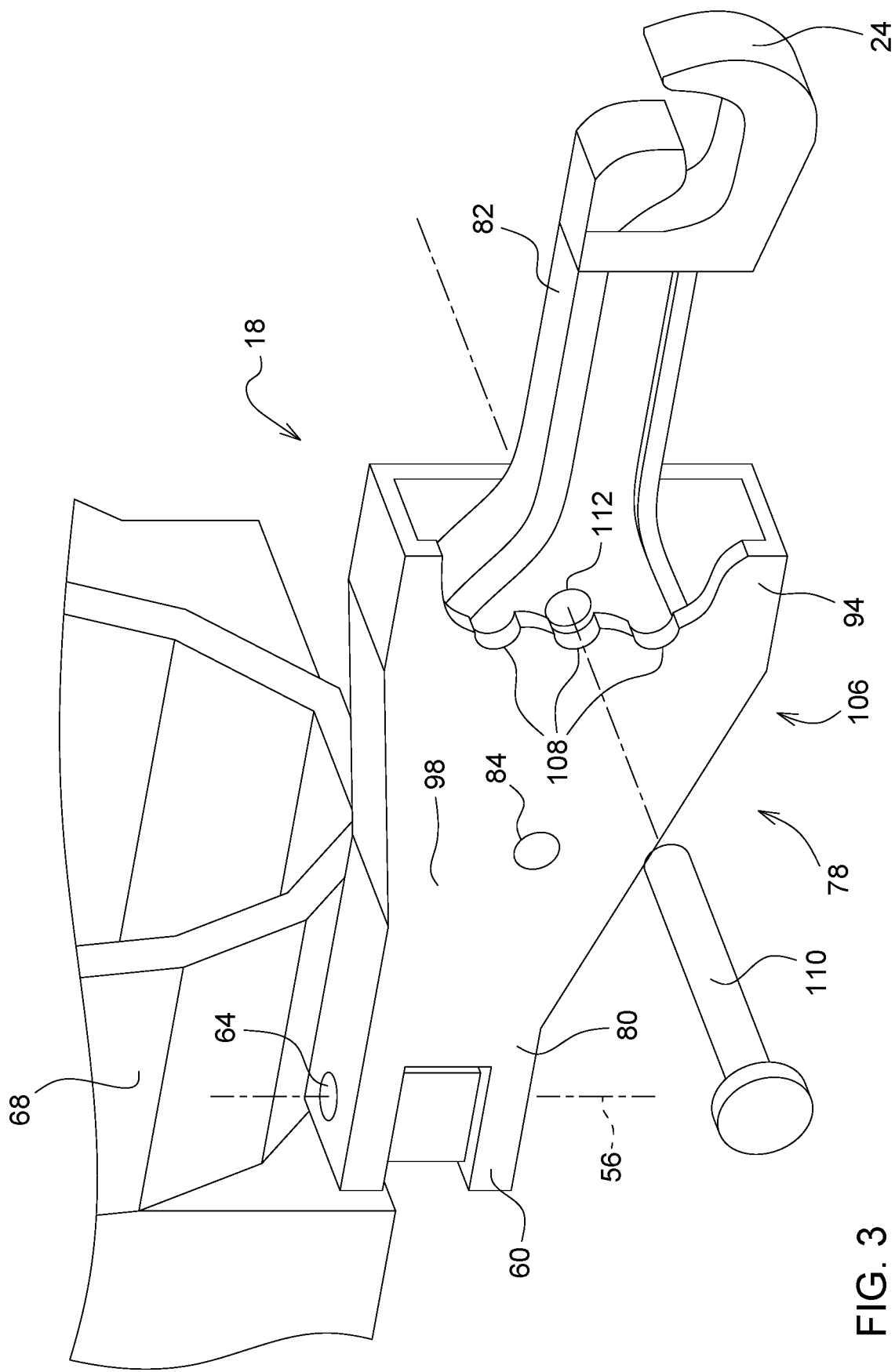
FIG. 3 shows an adjustment means or mechanism encompassed by the power lift according to FIG. 1 corresponding to a second configuration.

According to FIG. 2 or 3, in a representative manner, an adjustment means or mechanism 78 is provided at left lower link 18 for height adjustment of coupling element 24 independently of a pivoting movement performed by hydraulic lifting cylinders 52, 54. This enables compensation of an incorrect vertical position present between lower coupling points 30, 32 of the agricultural attachment. On the grounds of clarity, only left lower link 18 is represented in FIGS. 2 and 3, right lower link 20 is formed to be identical or in mirror image in relation to adjustment means 78.

Lower link 18 is divided by length into a first lower link segment 80 assigned to supporting structure 16 and a second lower link segment 82 which supports coupling element 24. Second lower link segment 82 can be pivoted vertically by adjustment means or mechanism 78 and locked in different pivoting positions. To this end, adjustment means or mechanism 78 comprises a pin joint 84 which connects the two lower link segments 80, 82 as well as a locking means or mechanism 86 for fixing a pivoting movement performed via pin joint 84.

There are various possibilities in terms of the technical implementation of adjustment means or mechanism 78, in particular of locking means or mechanism 86 encompassed by it.

FIG. 2 shows a sectional representation of a first configuration of adjustment means or mechanism 78, in the case of which adjustment means or mechanism 78 for pivoting and locking the two lower link segments 80, 82 has a self-locking spindle drive 88. Spindle drive 88 can be actuated by hand, for example, by a crank 90, therefore enables a force-saving continuous pivoting of the two lower link segments 80, 82, wherein these are always locked in their respective pivoting position as a result of the self-locking properties of spindle drive 88. Spindle drive 88 comprises a threaded spindle 92 which can be rotated by the crank 90, which is supported within a holder 94 formed on first lower link segment 80 and engages into a thread insert 96 mounted in the second lower link segment 82. Holder 94 comprises a shoe-shaped housing 98 which is formed in one piece on first lower link segment 80 and which equally surrounds internal pin joint 84 in a protective manner. On the grounds of improved clarity, housing 98 is represented in a cut-out manner in the region of spindle drive 88. Thread insert 96 is mounted in the form of a threaded sleeve 100 rotatably within a recess 102 provided on second lower link segment 82. Crank 90 can, in an unused state, be moved into a parking position and be secured there by a spring clip 104 mounted on holder 94.

FIG. 3 shows a sectional representation of a second configuration of adjustment means or mechanism 78, in the case of which adjustment means or mechanism 78 has a detachable bolt connection 106 for locking of both lower link segments 80, 82 in one of several fixed pivot positions. Holder 94 formed on first lower link segment 80 comprises in this case several openings 108 which correspond to the individual pivot positions for receiving a mounting bolt 110 which engages in a mating opening 112 provided in second lower link segment 82 for locking of second lower link segment 82. Mounting bolt 110 is secured at its free end by a splint (not represented) from unintentionally falling out of holder 94. Housing 98 is also represented in a cut-out manner here so that inner mating opening 112 is visible.

For adjustment of second lower link segment 82, mounting bolt 110 is initially removed from holder 94, second lower link segment 82 is moved into the desired pivot position until mating opening 112 in second lower link segment 82 is aligned with desired openings 118 in holder 94, and subsequently locked by pushing through mounting bolt 110.

While exemplary embodiments incorporating the principles of the present disclosure have been disclosed hereinabove, the present disclosure is not limited to the disclosed embodiments. Instead, this application is intended to cover any variations, uses, or adaptations of the disclosure using its general principles. Further, this application is intended to cover such departures from the present disclosure as come within known or customary practice in the art to which this disclosure pertains and which fall within the limits of the appended claims.

The invention claimed is:

1. A power lift for an agricultural tractor, comprising:
a supporting structure configured to be mounted on the agricultural tractor; and
a left lower link, a right lower link, and an upper link coupled in a pivotally movable manner, wherein the left and the right lower links and the upper link include coupling elements for attachment of an agricultural attachment;
wherein the left and the right lower links are rotatably coupled to one another via a lifting shaft, the lifting shaft being aligned with a lower link pivot axis;
wherein the left and the right lower links are pivotable by an actuating element which runs between at least one of the lower links and a support point of the supporting structure jointly about the lower link pivot axis in relation to the supporting structure;
wherein the supporting structure is formed by a differential housing.

2. The power lift of claim 1, wherein each of the left and right lower links is pivotally articulated at the lifting shaft about a transverse axis defined perpendicular to the lower link pivot axis.

3. The power lift of claim 1, wherein the actuating element comprises a hydraulic lifting cylinder which is articulated with a lower end at the lower link and with an upper end at the support point of the supporting structure; and
wherein the support point is formed as a boom-shaped retaining leg which is attached on an upper side of the differential housing and on which the actuating element is articulated with the upper end.

4. The power lift of claim 1, further comprising an adjustment mechanism provided at one of the two lower links for height adjustment of the coupling element independently of a pivoting movement performed by the at least one actuating element.

5. The power lift of claim 4, wherein the left or the right lower link is divided by length into a first lower link segment assigned to the supporting structure and a second lower link segment which supports the coupling element.

6. The power lift of claim 5, wherein the second lower link segment is pivoted vertically by the adjustment mechanism with respect to the first lower link segment.

7. The power lift of claim 6, wherein the second lower link segment is lockable at different pivoting positions.

8. The power lift of claim 7, wherein the adjustment mechanism for pivoting and locking the two lower link segments comprises a self-locking spindle drive.

9. The power lift of claim 7, wherein the adjustment means comprises a detachable bolt connection for locking the two lower link segments in one or more fixed pivoting positions.

10. An agricultural tractor, comprising:
a power lift comprising a supporting structure configured to be mounted on the agricultural tractor; and
a first lower link, a second lower link, and an upper link coupled in a pivotally movable manner, wherein both lower links and the upper link comprise coupling elements;
wherein the first and second lower links are rotatably coupled to one another via a lifting shaft, the lifting shaft being aligned with a lower link pivot axis;
wherein the first and second lower links are pivotable by an actuating element which extends between at least one of the lower links and a support point of the supporting structure jointly about the lower link pivot axis in relation to the supporting structure;
wherein the supporting structure is formed by a differential housing.

11. The agricultural tractor of claim 10, wherein each of the first and second lower links is pivotally articulated at the lifting shaft about a transverse axis defined perpendicular to the lower link pivot axis.

12. The agricultural tractor of claim 10, wherein the actuating element comprises a hydraulic lifting cylinder which is articulated with a lower end at the lower link and an upper end at the support point of the supporting structure; and wherein the support point is formed as a boom-shaped retaining leg which is attached on an upper side of the differential housing and on which the hydraulic lifting cylinder is articulated with the upper end.

13. The agricultural tractor of claim 10, further comprising an adjustment mechanism provided at one of the two lower links for height adjustment of the coupling element independently of a pivoting movement performed by the actuating element.

14. The agricultural tractor of claim 13, wherein either the first or second lower link is divided by length into a first lower link segment assigned to the supporting structure and a second lower link segment which supports the coupling element, wherein the second lower link segment is pivoted vertically by the adjustment mechanism with respect to the first lower link segment.

15. The agricultural tractor of claim 14, wherein the second lower link segment is lockable at different pivoting positions.

16. The agricultural tractor of claim 14, wherein the adjustment mechanism for pivoting and locking the two lower link segments comprises a self-locking spindle drive.

17. The agricultural tractor of claim 14, wherein the adjustment means comprises a detachable bolt connection for locking the two lower link segments in one or more fixed pivoting positions.

18. A power lift for an agricultural tractor, comprising:
a support structure configured to be mounted on the agricultural tractor; and
a first link, a second link, and a third link coupled in a pivotally movable manner, wherein the first, second and third links include coupling elements for attachment of an agricultural attachment;
wherein the first and the second links are rotatably coupled to one another via a lifting shaft, the lifting shaft being aligned with a lower link pivot axis;
wherein the first and the second links are pivotable by an actuating element which extends between at least one of the first and second links and a support point of the supporting structure;
wherein each of the first and second links is pivotally articulated at the lifting shaft about a transverse axis defined perpendicular to the lower link pivot axis;
wherein the actuating element comprises a hydraulic lifting cylinder which is articulated with a lower end at the first or second link and with an upper end at the support point of the support structure;
wherein the supporting structure is formed by a differential housing.

19. The power lift of claim 18, wherein:
the first or second link is divided by length into a first lower link segment assigned to the supporting structure and a second lower link segment which supports the coupling element;
the second lower link segment is pivoted vertically by an adjustment mechanism with respect to the first lower link segment;
the second lower link segment is lockable at different pivoting positions.

20. The power lift of claim 18, wherein the support point is formed as a boom-shaped retaining leg which is attached on an upper side of the differential housing and on which the hydraulic lifting cylinder is articulated with the upper end.

* * * * *